United States Patent
Haich et al.

(10) Patent No.: US 8,306,205 B2
(45) Date of Patent: Nov. 6, 2012

(54) APPARATUS AND METHOD FOR OPERATING A CONFERENCE ASSISTANCE SYSTEM

(75) Inventors: Jonathon F. Haich, Bailey, CO (US); Brian Scot Hillis, Centennial, CO (US); Renato Pinheiro Simoes, Fortaleza (BR); Pier Angelo Tognini Filho, Goiania (BR)

(73) Assignee: Avaya Inc., Basking Ridge, NJ (US)

( * ) Notice: Subject to any disclaimer, the term of this patent is extended or adjusted under 35 U.S.C. 154(b) by 166 days.

(21) Appl. No.: 12/977,260

(22) Filed: Dec. 23, 2010

(65) Prior Publication Data

US 2011/0150201 A1    Jun. 23, 2011

Related U.S. Application Data

(60) Provisional application No. 61/289,667, filed on Dec. 23, 2009.

(51) Int. Cl.
*H04M 3/42* (2006.01)
(52) U.S. Cl. ............... 379/202.01; 370/260; 709/204
(58) Field of Classification Search ............. 379/202.01; 370/260; 709/204
See application file for complete search history.

(56) References Cited

U.S. PATENT DOCUMENTS

| 5,499,288 | A | 3/1996 | Hunt et al. |
| 6,327,344 | B1 | 12/2001 | Paxson |
| 6,694,009 | B1 * | 2/2004 | Anderson et al. ........ 379/266.06 |
| 7,054,819 | B1 | 5/2006 | Loveland |
| 7,593,520 | B1 | 9/2009 | Croak et al. |
| 2004/0203637 | A1 | 10/2004 | Dodla |
| 2007/0071203 | A1 * | 3/2007 | Boyer et al. .................. 379/158 |
| 2008/0165944 | A1 * | 7/2008 | Rosenthal et al. ........ 379/202.01 |

FOREIGN PATENT DOCUMENTS

WO    2008080849 A1    7/2008

* cited by examiner

*Primary Examiner* — Creighton Smith

(57) ABSTRACT

A method for operating a conference assistance system is provided. The method includes receiving a conference code over a call established with an originating system, wherein the conference code is entered by a user over the call to initiate a conference session, and in response to receiving the conference code, identifying a conference system for the user. The method also includes upon identifying the conference system, initiating the conference session on behalf of the user with the conference system, and transferring the conference code to the conference system to authorize the conference session. The method further includes upon authorization of the conference session, connecting the conference system with the originating system to enable the conference session for the user.

20 Claims, 7 Drawing Sheets

APPARATUS AND METHOD FOR OPERATING A CONFERENCE ASSISTANCE SYSTEM

RELATED APPLICATIONS

This application hereby claims the benefit of and priority to U.S. Provisional Patent Application No. 61/289,667, titled "SPEECH-ENABLING A CONFERENCE SERVER LOGIN PROCESS", filed on Dec. 23, 2009, and which is hereby incorporated by reference in its entirety.

TECHNICAL BACKGROUND

As an alternative to, or in addition to, business travel, many people are using telephonic and video conferencing services to communicate with distant clients, customers, and co-workers. Typically, these services require a user to dial a conference server to initiate a conference session. The conference server then prompts the user to enter a conference code. This conference code may be a host code or a participant code.

When a host code is entered, the conference server starts the conference session and connects the host user with any participants that have connected to the conference server. When a participant code is entered, the conference server checks to see if the host has started the conference session and if so, connects the participating user with the conference session. If the host has not started the conference session, the participating user is placed on hold to await the start of the conference session.

Typically host codes and participant codes are entered by users on a touch tone phone which transmits dual tone multi-frequency (DTMF) signals to the conference server. As participants join or drop from the conference sessions tones are played in the conference session to notify the host and participants that another participant has either joined or dropped from the conference session. However, typically, there is no indication of the identity of participants that have dropped from the conference session.

OVERVIEW

In an embodiment, a method for operating a conference assistance system is provided. The method includes receiving a conference code over a call established with an originating system, wherein the conference code is entered by a user over the call to initiate a conference session, and in response to receiving the conference code, identifying a conference system for the user.

The method also includes upon identifying the conference system, initiating the conference session on behalf of the user with the conference system, and transferring the conference code to the conference system to authorize the conference session. The method further includes upon authorization of the conference session, connecting the conference system with the originating system to enable the conference session for the user.

In another embodiment, a communication system is provided. The communication system includes an originating system, and a conference assistance system, communicatively coupled with the originating system. The conference assistance system is configured to receive a conference code over a call established with the originating system, wherein the conference code is entered by a user over the call to initiate a conference session. In response to receiving the conference code, the conference assistance system is configured to identify a conference system for the user.

Upon identifying the conference system, the conference assistance system is configured to initiate the conference session on behalf of the user with the conference system. The conference assistance system is also configured to transfer the conference code to the conference system to authorize the conference session, and upon authorization of the conference session, to connect the conference system with the originating system to enable the conference session for the user.

In a further embodiment, a conference assistance system is provided. The conference assistance system includes a processing system, and a communication interface, coupled with the processing system. The conference assistance system is configured to receive a conference code over a call established with an originating system through the communication interface, wherein the conference code is entered by a user over the call to initiate a conference session.

In response to receiving the conference code, the processing system identifies a conference system for the user. Upon identifying the conference system, the processing system initiates the conference session on behalf of the user with the conference system through the communication interface. The conference assistance system is also configured to transfer the conference code to the conference system to authorize the conference session through the communication interface, and upon authorization of the conference session, to connect the conference system with the originating system through the communication interface to enable the conference session for the user.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
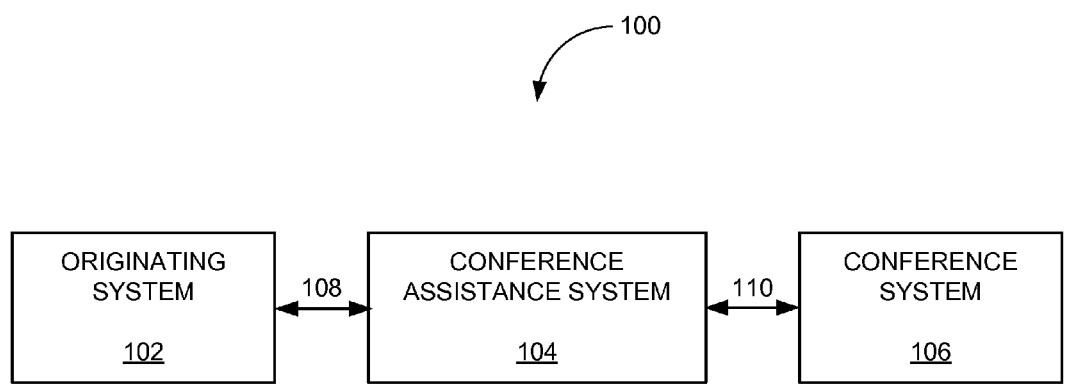
FIG. 1 illustrates an embodiment of a communication system including a conference assistance system.

FIG. 1 illustrates an embodiment of a communication system 100 including a conference assistance system 104. In this example, communication system 100 includes originating system 102, conference assistance system 104, and conference system 106. These systems are coupled to each other through links 108 and 110.

Links 108 and 110 may use any of a variety of communication media, such as air, metal, optical fiber, or any other signal propagation path, including combinations thereof. Also, the links may use any of a variety of communication protocols, such as internet, telephony, optical networking, wireless communication, wireless fidelity, code division multiple access, worldwide interoperability for microwave access, or any other communication protocols and formats, including combinations thereof. Further, the links could be direct links or they might include various intermediate components, systems, and networks.

In this example embodiment, a user connects to a conference session on conference system 106 from originating system 102. Conference assistance system 104 acts as an interface between originating system 102 and conference system 106 to enhance the experience of the user in the conference session.

In an example, conference assistance system 104 receives a conference code over a call established with originating system 102. The conference code is entered by a user over the call to initiate a conference session. In response to receiving the conference code, conference assistance system 104 identifies a conference system 106 for the user. Conference assistance system 104 may use any of a wide variety of methods to identify conference system 106 based on the conference code, the identity of the user, or other information available to conference assistance system 104.

For example, conference assistance system 104 may include in storage a look-up table containing identities of conference systems based on conference codes. In other examples, conference assistance system 104 may identify conference system 106 based on the identity of the user, the location of the user, the communication device used to connect to conference assistance system 104, or other available data.

Upon identifying conference system 106, conference assistance system 104 initiates a conference session on behalf of the user with conference system 106. Conference assistance system 104 transfers the conference code to conference system 106 to authorize the conference session. Upon authorization of the conference session, conference assistance system 104 connects conference system 106 with originating system 102 to enable the conference session for the user.

In some embodiments, the conference code may be spoken by the user. In some cases, conference assistance system 104 prompts the user to audibly speak the conference code. In such examples, conference assistance system 104 translates the speech from the user into computer-readable data. The computer-readable data may then be translated into DTMF tones which many conference systems expect to receive. Conference assistance system 104 sends the DTMF tones representing the conference code spoken by the user to conference system 106 which then may authorize the conference session for the user.

In further embodiments, originating system 102 and conference assistance system 104 may be operated by a corporation to allow their employees easy access to conference services. In such an embodiment, originating system 102 may be configured to detect when a user enters a conference code into a communication device in place of a phone number. When originating system 102 detects a conference code entered instead of a phone number, it automatically connects the user with conference assistance system 104 to enable the setup of a conference session.

In some embodiments, conference assistance system 104 may be configured to respond to voice commands from the user. For example, a user may say "connect me to my last conference" and in response, conference assistance system 104 would determine the last conference system used by the user and the last conference code used by the user with that conference system, and then proceed to set up a conference session on that specific conference system using that specific conference code.

In other embodiments, conference assistance system 104 may be used to collect data regarding participants in a conference session. In such an embodiment, conference assistance system 104 maintains logs of participating users and their status with the conference session. For example, conference assistance system 104 may maintain a list of current participants in the conference, along with data regarding when participants have entered and left the conference. This conference session data may be incorporated in a computer file and provided to the conference host, or other participants.

In further embodiments, conference assistance system 104 creates conference session data files including status data of conference attendees. Conference assistance system 104 determines an identity of at least one other user participating in the conference session, a connection state of the user and the at least one other user with the conference session, and connection and disconnection times of the user and the at least one other user with the conference session.

Conference assistance system 104 creates a conference session data file including the identity of the at least one other user, the connection states of the user and the at least one other user, and the connection and disconnection times of the user and the at least one other user, and provides the conference session data file to the user.

Figure 2:
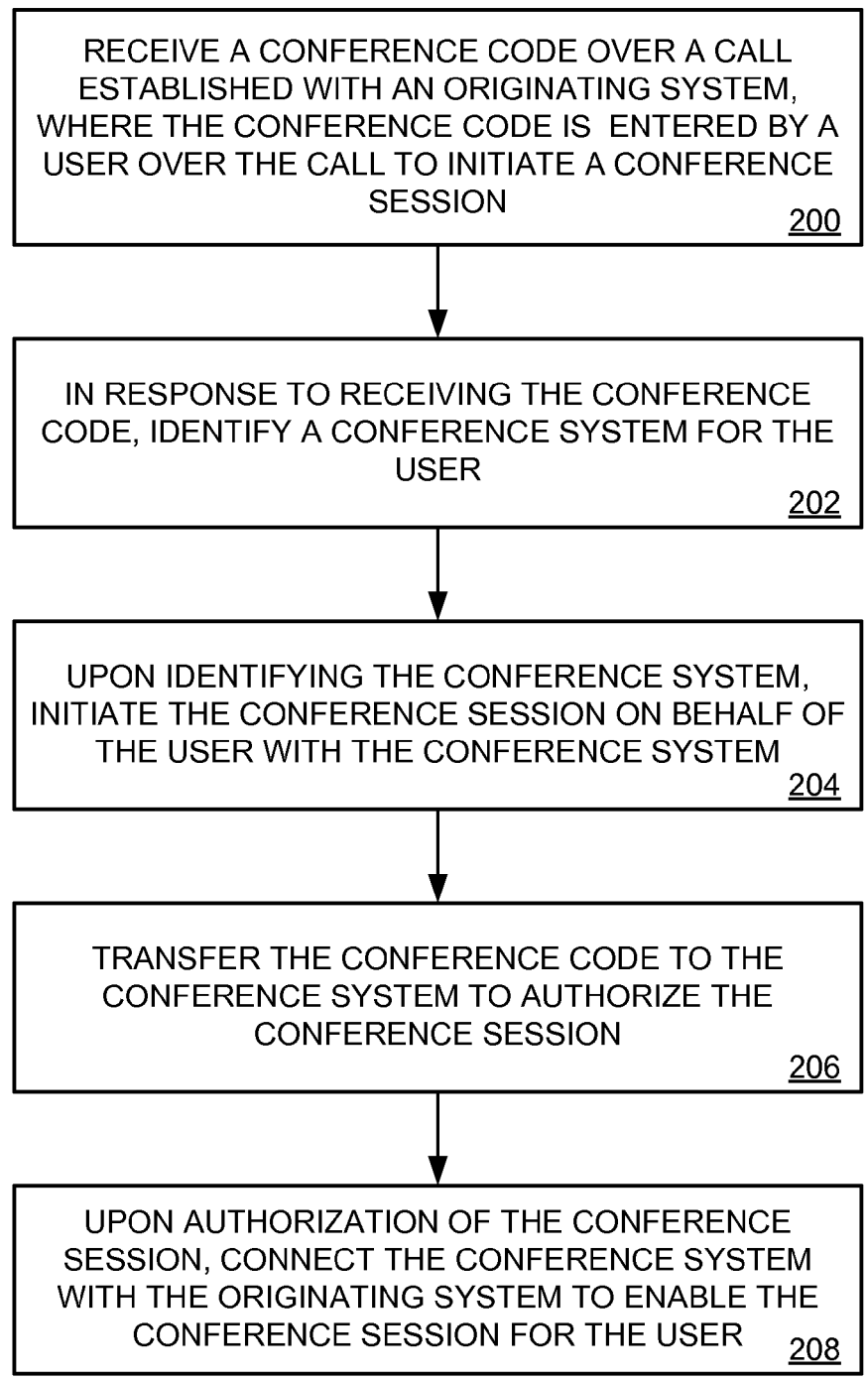
FIG. 2 illustrates an embodiment of a method for operating a conference assistance system.

FIG. 2 illustrates an embodiment of a method for operating a conference assistance system 104. In this example method, conference assistance system 104 receives a conference code over a call established with originating system 102, where the conference code is entered by a user over the call to initiate a conference session, (operation 200).

In response to receiving the conference code, conference assistance system 104 identifies a conference system, such as conference system 106, for the user, (operation 202). Upon identifying conference system 106, conference assistance system 104 initiates the conference session on behalf of the user with conference system 106, (operation 204).

Conference assistance system 104 transfers the conference code to conference system 106 to authorize the conference session, (operation 206). Upon authorization of the conference session, conference assistance system 104 connects conference system 106 with originating system 102 to enable the conference session for the user, (operation 208).

Figure 3:
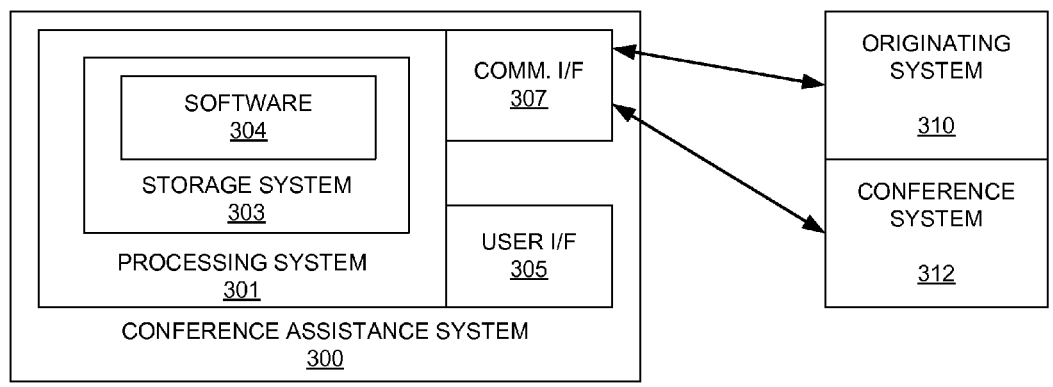
FIG. 3 illustrates an embodiment of a device operable as a conference assistance system.

FIG. 3 illustrates an embodiment of a device operable as a conference assistance system. Conference assistance system 300 may be implemented as part of a communication system as shown in FIG. 1. Conference assistance system 300 includes communication interface 307, user interface 305, and processing system 301. Processing system 301 is linked to communication interface 307 and user interface 305 through a bus. Processing system 301 includes processing circuitry and storage system 303 that stores operating software 304.

Communication interface 307 includes components that communicate over communication links, such as network cards, ports, RF transceivers, processing circuitry and software, or some other communication devices. Communication interface 307 may be configured to communicate over metallic, wireless, or optical links. Communication interface 307 may be configured to use time division multiplexing (TDM), IP, Ethernet, optical networking, wireless protocols, communication signaling, or some other communication format—including combinations thereof.

User interface 305 includes components that interact with a user. User interface 305 may include a keyboard, display, mouse, touch pad, or some other user input/output apparatus.

Processing system 301 includes a microprocessor and other circuitry that retrieves and executes operating software 304 from storage system 303. Storage system 303 includes a disk drive, flash drive, data storage circuitry, or some other memory apparatus. Operating software 304 includes computer programs, firmware, or some other form of machine-readable processing instructions. Operating software 304 may be non-volatile machine-readable instructions. Operating software 304 may include an operating system, utilities, drivers, network interfaces, applications, or some other type of software. When executed by processing system 301, operating software 304 directs processing system 301 to operate conference assistance system 300 as described herein.

Figure 4:
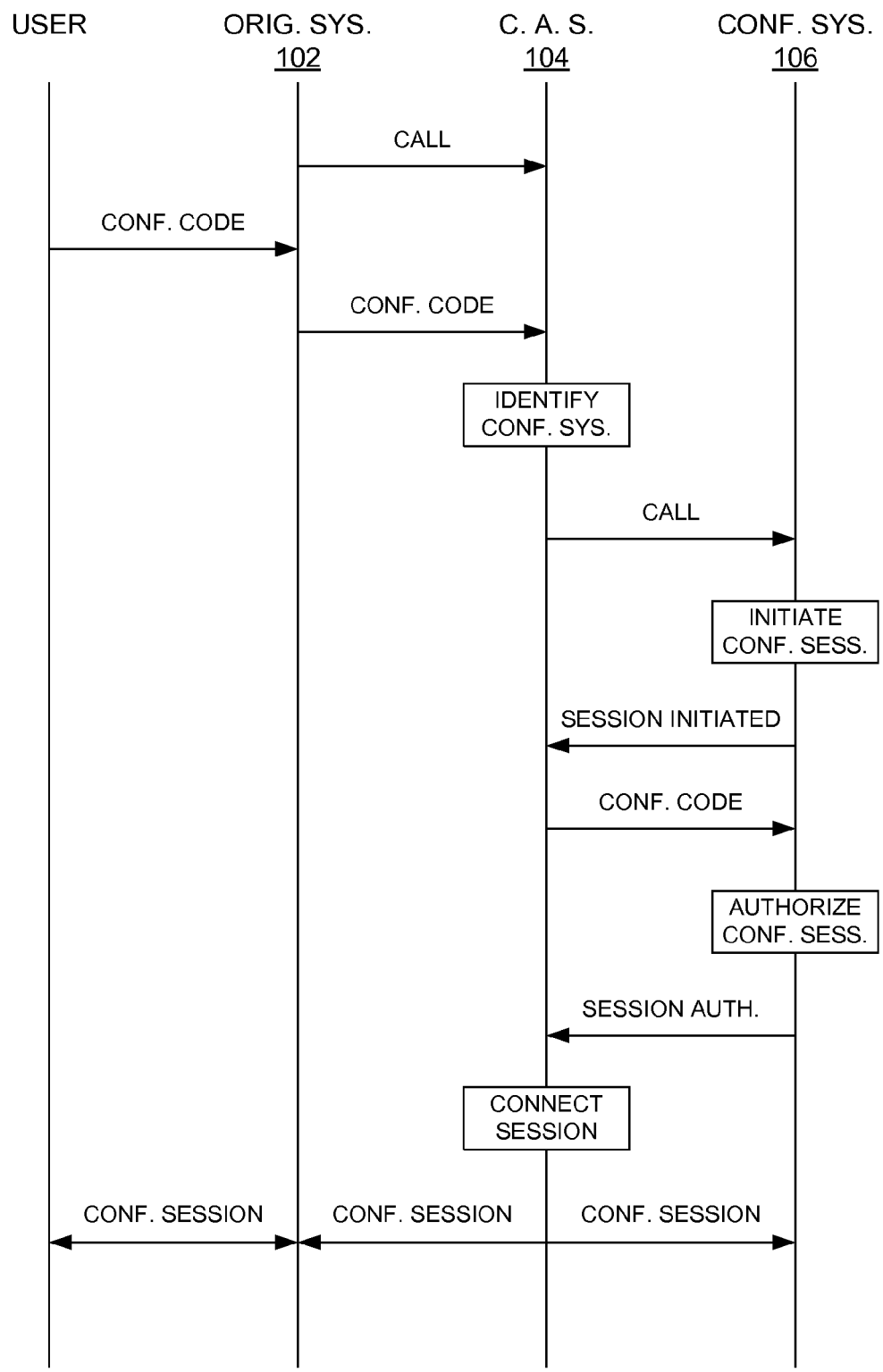
FIG. 4 illustrates an embodiment of a method for operating a communication system including a conference assistance system.

FIG. 4 illustrates an embodiment of a method for operating a communication system 100 including a conference assistance system 104. In this example, a call is setup between originating system 102 and conference assistance system 104. This call may be established by any of a number of ways. For example, originating system may include a communications processor which detects when a user enters a conference code into a communication device, and then automatically establishes a call with conference assistance system 104. The call can be established using various telecommunication protocols such as Session Initiation Protocol (SIP), Integrated Digital Services Network (ISDN), Plain Old Telephone Service (POTS), and the like.

The user enters, speaks, or otherwise transfers a conference code to conference assistance system 104 through originating system 102. Conference assistance system 104 identifies conference system 106 for use in establishing a conference session for the user. Conference assistance system 104 calls conference system 106 to initiate a conference session for the user. Conference system 106 initiates the conference session for the user and signals conference assistance system 104 that the conference session has been initiated.

Conference assistance system 104 transfers the conference code to conference system 106, which in turn authorizes the conference session and signals to conference assistance system 104 that the session has been authorized. Conference assistance system 104 then connects the user to the conference session on conference system 106 through originating system 102.

Figure 5:
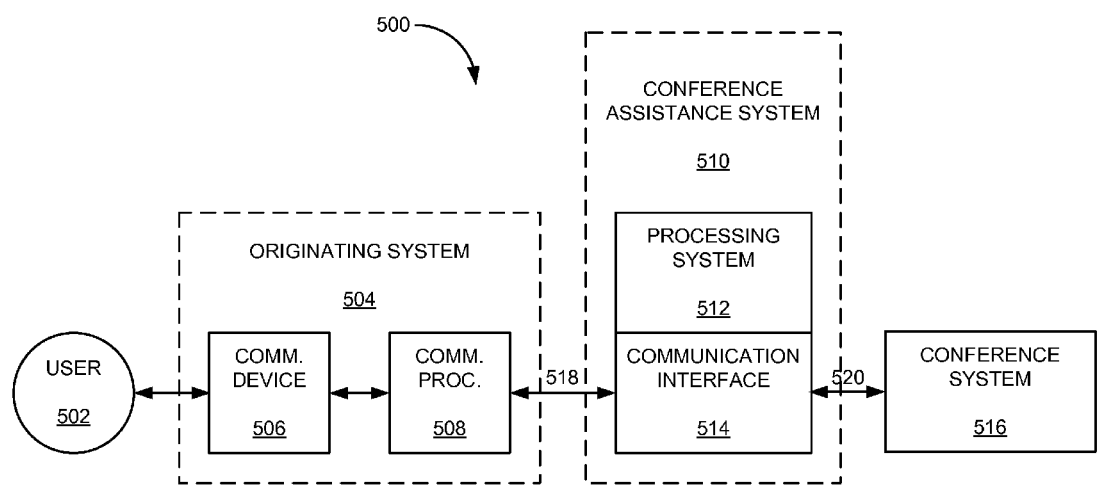
FIG. 5 illustrates an embodiment of a communication system including a conference assistance system.

FIG. 5 illustrates an embodiment of a communication system 500 including a conference assistance system 510. In this example, communication system 500 includes originating system 504, conference assistance system 510, and conference system 516. These systems are coupled to each other through links 518 and 520.

Links 518 and 520 may use any of a variety of communication media, such as air, metal, optical fiber, or any other signal propagation path, including combinations thereof. Also, the links may use any of a variety of communication protocols, such as internet, telephony, optical networking, wireless communication, wireless fidelity, code division multiple access, worldwide interoperability for microwave access, or any other communication protocols and formats, including combinations thereof. Further, the links could be direct links or they might include various intermediate components, systems, and networks.

In this example embodiment, user 502 connects to a conference session on conference system 516 from originating system 504. Conference assistance system 510 acts as an interface between originating system 504 and conference system 516 to enhance the experience of the user in the conference session.

Originating system 504 includes communication device 506 and communication processor 508. Communication device 506 may be any device capable of operating in a telephonic or video conferencing mode with conference system 516. Communication processor 508 may be any type of communication processing equipment such as a private branch exchange (PBX).

Conference assistance system 510 includes processing system 512 and communication interface 514. An example conference assistance system 510 is shown in more detail in FIG. 3. Conference assistance system 510 communicates with originating system 504 and conference system 516 through communication interface 514 and links 518 and 520.

In an example, conference assistance system 510 receives a conference code over a call established with originating system 504. The conference code is entered by user 502 over the call to initiate a conference session. In response to receiving the conference code, conference assistance system 510 identifies a conference system 516 for user 502. Conference assistance system 510 may use any of a wide variety of methods to identify conference system 516 based on the conference code, the identity of user 502, or other information available to conference assistance system 510.

For example, conference assistance system 510 may include in storage a look-up table containing identities of conference systems based on conference codes. In other examples, conference assistance system 510 may identify conference system 516 based on the identity of user 502, the location of user 502, the communication device used to connect to conference assistance system 510, or other available data.

Upon identifying conference system 516, conference assistance system 510 initiates a conference session on behalf of user 502 with conference system 516. Conference assistance system 510 transfers the conference code to conference system 516 to authorize the conference session. Upon authorization of the conference session, conference assistance system 510 connects conference system 516 with originating system 504 to enable the conference session for user 502.

In some embodiments, the conference code may be spoken by user 502. In some cases, conference assistance system 510 prompts user 502 to audibly speak the conference code. In such examples, conference assistance system 510 translates the speech from user 502 into computer-readable data. The computer-readable data may then be translated into DTMF tones which many conference systems 516 expect to receive. Conference assistance system 510 sends the DTMF tones representing the conference code spoken by user 502 to conference system 516 which then may authorize the conference session for user 502.

In further embodiments, originating system 504 and conference assistance system 510 may be operated by a corporation to allow their employees easy access to conference services. In such an embodiment, communication processor 508 may be configured to detect when user 502 enters a conference code into communication device 506 in place of a phone number. When communication processor 508 detects a conference code entered instead of a phone number, it automatically connects communication device 506 with conference assistance system 510 to enable the setup of a conference session.

In some embodiments, conference assistance system 510 may be configured to respond to voice commands from user 502. For example, user 502 may say "connect me to my last conference" and in response, conference assistance system 510 would determine the last conference system used by user 502 and the last conference code used by user 502 with that conference system, and then proceed to set up a conference session on that specific conference system using that specific conference code.

In other embodiments, conference assistance system 510 may be used to collect data regarding participants in a conference session. In such an embodiment, conference assistance system 510 maintains logs of participating users and their status with the conference session. For example, conference assistance system 510 may maintain a list of current participants in the conference, along with data regarding when participants have entered and left the conference. This conference session data may be incorporated in a computer file and provided to the conference host, or other participants.

Figure 6:
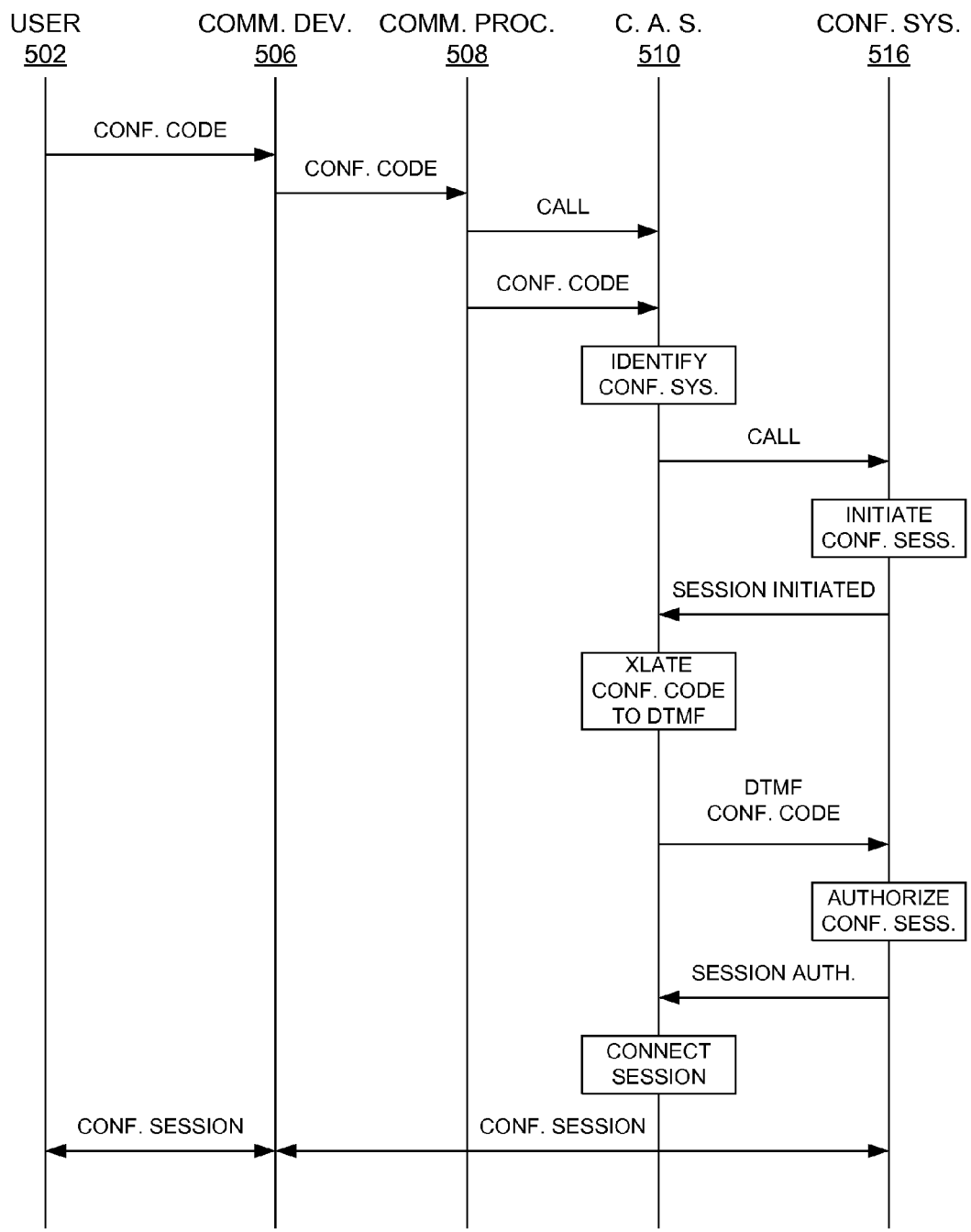
FIG. 6 illustrates an embodiment of a method for operating a communication system including a conference assistance system.

FIG. 6 illustrates an embodiment of a method for operating a communication system including a conference assistance system 510. In this example, user 502 enters a conference code on communication device 506. Communication processor 508 detects the conference code and automatically calls conference assistance system 510. Communication processor 508 then transfers the conference code to conference assistance system 510 over the call.

Conference assistance system 510 identifies conference system 516 based on the conference code, the identity of user 502, the location of user 502, the identity of communication device 506, the identity of communication processor 508, or other criteria. Upon identifying conference system 516, conference assistance system 510 calls conference system 516 to set up a conference session for user 502.

Conference system 516 initiates a conference session and signals to conference assistance system 510 that the conference session has been initiated. In some embodiments, simply calling conference system 516 is sufficient to initiate a conference session and the fact that conference system 516 has accepted the call is sufficient to indicate to conference assistance system 510 that the session has been initiated.

Conference assistance system 510 translates (if necessary) the conference code from user 502 into a DTMF signal and sends the conference code to conference system 516 as a DTMF signal. Conference system 516 authorizes the conference session based on the conference code and signals to conference assistance system 510 that the conference session has been authorized.

At this point, conference assistance system 510 connects the user with the conference session on conference system 516 through communication device 506, and optionally through communication processor 508. In some examples, conference assistance system 510 may remain connected to the conference session in order to track participants in the conference and to provide conference session data to user 502.

Figure 7:
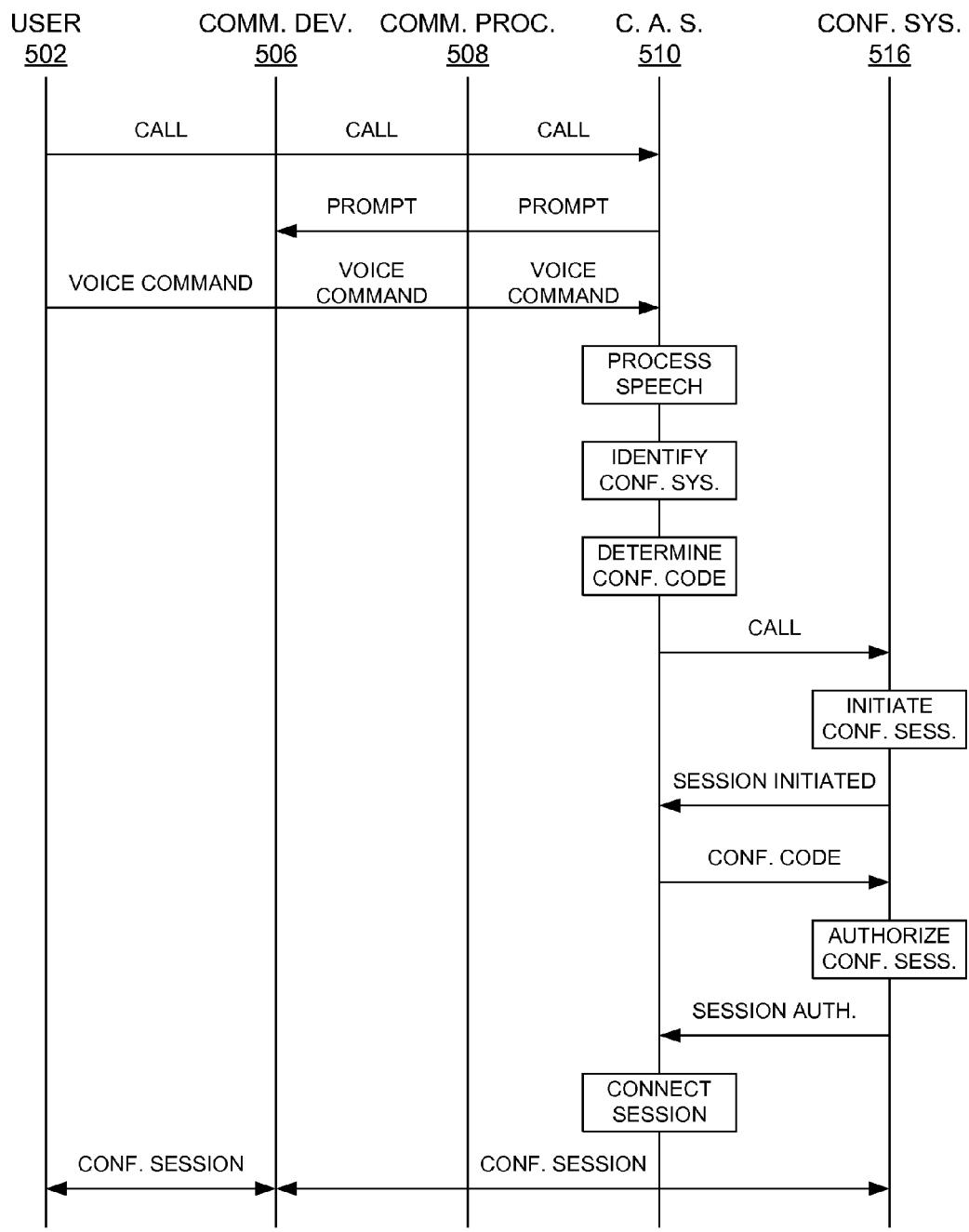
FIG. 7 illustrates an embodiment of a method for operating a communication system including a conference assistance system.

FIG. 7 illustrates an embodiment of a method for operating a communication system including a conference assistance system 510. In this example, user 502 calls conference assistance system 501 through communication device 506 and communication processor 508. Conference assistance system 510 prompts user 502 for a conference command through communication device 506. User 502 speaks a voice command to conference assistance system 510 through communication device 506 and communication processor 508.

This voice command may take any of a wide variety of formats. In some examples, user 502 may speak a conference code to conference assistance system 510. In other examples, user 502 may use voice commands such as "connect me to my last conference," "connect me to a conference on conference server 516," "join my conference," or the like. Conference assistance system 510 processes the speech from user 502 to identify a conference server, and to determine a conference code for user 502.

Conference assistance system 510 identifies conference system 516 based on any of a wide variety of data such as the voice command, the conference code, the identity of user 502, the location of user 502, the identity of communication device 506, the identity of communication processor 508, or other criteria. Upon identifying conference system 516, conference assistance system 510 calls conference system 516 to set up a conference session for user 502.

Conference system 516 initiates a conference session and signals to conference assistance system 510 that the conference session has been initiated. In some embodiments, simply calling conference system 516 is sufficient to initiate a conference session and the fact that conference system 516 has accepted the call is sufficient to indicate to conference assistance system 510 that the session has been initiated.

Conference assistance system 510 translates (if necessary) the conference code from user 502 into a DTMF signal and sends the conference code to conference system 516 as a DTMF signal. Conference system 516 authorizes the conference session based on the conference code and signals to conference assistance system 510 that the conference session has been authorized.

At this point, conference assistance system 510 connects the user with the conference session on conference system 516 through communication device 506, and optionally through communication processor 508. In some examples, conference assistance system 510 may remain connected to the conference session in order to track participants in the conference and to provide conference session data to user 502.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for operating a conference assistance system, the method comprising:

receiving a conference code over a call established with an originating system, wherein the conference code is entered by a user over the call to initiate a conference session;

in response to receiving the conference code, identifying a conference system for the user;

upon identifying the conference system, initiating the conference session on behalf of the user with the conference system;

transferring the conference code to the conference system to authorize the conference session; and upon authorization of the conference session, connecting the conference system with the originating system to enable the conference session for the user.

2. The method of claim 1, wherein receiving the conference code comprises:

audibly receiving the conference code as speech from the user; and processing the speech from the user to determine the conference code.

3. The method of claim 2, further comprising:

prompting the user to audibly speak the conference code.

4. The method of claim 1, wherein the call is established with the originating system in response to the user dialing the conference code.

5. The method of claim 1, wherein transferring the conference code comprises:

translating the conference code into a dual-tone multi-frequency signal; and sending the dual-tone multi-frequency signal to the conference system.

6. The method of claim 1, wherein identifying the conference system for the user comprises:

receiving a voice command from the user related to a desired conference system;

translating the voice command to a computer-readable command; and processing the computer-readable command to identify the desired conference system.

7. The method of claim 1, further comprising:

determining an identity of at least one other user participating in the conference session;

determining a connection state of the user and the at least one other user with the conference session;

determining connection and disconnection times of the user and the at least one other user with the conference session;

creating a conference session data file including the identity of the at least one other user, the connection states of the user and the at least one other user, and the connection and disconnection times of the user and the at least one other user; and providing the conference session data file to the user.

8. A communication system, comprising:

an originating system; and a conference assistance system, communicatively coupled with the originating system, the conference assistance system configured to:

receive a conference code over a call established with the originating system, wherein the conference code is entered by a user over the call to initiate a conference session;

in response to receiving the conference code, identify a conference system for the user;

upon identifying the conference system, initiate the conference session on behalf of the user with the conference system;

transfer the conference code to the conference system to authorize the conference session; and upon authorization of the conference session, connect the conference system with the originating system to enable the conference session for the user.

9. The communication system of claim 8, wherein receive the conference code comprises:

audibly receiving the conference code as speech from the user; and processing the speech from the user to determine the conference code.

10. The communication system of claim 9, wherein the conference assistance system is further configured to:

prompt the user to audibly speak the conference code.

11. The communication system of claim 8, wherein the call is established with the originating system in response to the user dialing the conference code.

12. The communication system of claim 8, wherein transfer the conference code comprises:

translating the conference code into a dual-tone multi-frequency signal; and sending the dual-tone multi-frequency signal to the conference system.

13. The communication system of claim 8, wherein identify the conference system for the user comprises:

receiving a voice command from the user related to a desired conference system;

translating the voice command to a computer-readable command; and processing the computer-readable command to identify the desired conference system.

14. The communication system of claim 8, wherein the conference assistance system is further configured to:

determine an identity of at least one other user participating in the conference session;

determine a connection state of the user and the at least one other user with the conference session;

determine connection and disconnection times of the user and the at least one other user with the conference session;

create a conference session data file including the identity of the at least one other user, the connection states of the user and the at least one other user, and the connection and disconnection times of the user and the at least one other user; and provide the conference session data file to the user.

15. A conference assistance system comprising:

a processing system; and a communication interface, coupled with the processing system;

wherein the conference assistance system is configured to:

receive a conference code over a call established with an originating system through the communication interface, wherein the conference code is entered by a user over the call to initiate a conference session;

in response to receiving the conference code, the processing system identifies a conference system for the user;

upon identifying the conference system, the processing system initiates the conference session on behalf of the user with the conference system through the communication interface;

transfer the conference code to the conference system to authorize the conference session through the communication interface; and upon authorization of the conference session, connect the conference system with the originating system through the communication interface to enable the conference session for the user.

16. The conference assistance system of claim 15, wherein receive the conference code comprises:
audibly receiving the conference code as speech from the user through the communication interface; and
processing the speech from the user in the processing system to determine the conference code.

17. The conference assistance system of claim 15, wherein the call is established with the originating system in response to the user dialing the conference code.

18. The conference assistance system of claim 15, wherein transfer the conference code comprises:
translating the conference code into a dual-tone multi-frequency signal in the processing system; and
sending the dual-tone multi-frequency signal to the conference system through the communication interface.

19. The conference assistance system of claim 15, wherein identify the conference system for the user comprises:
receiving a voice command from the user related to a desired conference system through the communication interface;
translating the voice command to a computer-readable command in the processing system; and
processing the computer-readable command in the processing system to identify the desired conference system.

20. The conference assistance system of claim 15, wherein the processing system is further configured to:
determine an identity of at least one other user participating in the conference session;
determine a connection state of the user and the at least one other user with the conference session;
determine connection and disconnection times of the user and the at least one other user with the conference session;
create a conference session data file including the identity of the at least one other user, the connection states of the user and the at least one other user, and the connection and disconnection times of the user and the at least one other user; and
provide the conference session data file to the user through the communication interface.

* * * * *